US012449281B2

(12) United States Patent
Arlot (10) Patent No.: US 12,449,281 B2
(45) Date of Patent: Oct. 21, 2025

(54) CONTACTLESS POSITION SENSOR COMPRISING A PERMANENT MAGNET

(71) Applicant: Absolute Magnetics AG, Bühler (CH)

(72) Inventor: Richard Arlot, Bonnevent-Velloreille (FR)

(73) Assignee: Absolute Magnetics AG, Bühler (CH)

( * ) Notice: Subject to any disclaimer, the term of this patent is extended or adjusted under 35 U.S.C. 154(b) by 187 days.

(21) Appl. No.: 18/261,382

(22) PCT Filed: Jan. 6, 2022

(86) PCT No.: PCT/FR2022/050028
§ 371 (c)(1),
(2) Date: Jul. 13, 2023

(87) PCT Pub. No.: WO2022/152996
PCT Pub. Date: Jul. 21, 2022

(65) Prior Publication Data
US 2024/0068840 A1    Feb. 29, 2024

(30) Foreign Application Priority Data
Jan. 14, 2021    (FR) ........................................ 2100365

(51) Int. Cl.
G01D 5/14        (2006.01)
G01R 33/09       (2006.01)

(52) U.S. Cl.
CPC ........... *G01D 5/145* (2013.01); *G01R 33/091* (2013.01)

(58) Field of Classification Search
CPC ............................... G01D 5/145; G01R 33/091
See application file for complete search history.

(56) References Cited

U.S. PATENT DOCUMENTS

| 9,719,771 B2 * | 8/2017 | Ausserlechner | ......... G01D 5/12 |
| 2007/0090827 A1 * | 4/2007 | Jarrard | ................... G01D 5/145 324/207.2 |
| 2022/0349696 A1 * | 11/2022 | Launay | ..................... G01D 5/16 |

FOREIGN PATENT DOCUMENTS

| EP | 2711663 A1 | 3/2014 |
| FR | 2898189 A1 | 9/2007 |
| FR | 2919385 A1 | 1/2009 |
| FR | 2923903 A1 | 5/2009 |

(Continued)

OTHER PUBLICATIONS

International Search Report for International Application No. PCT/FR2022/050028 dated May 11, 2022, 3 pages.

(Continued)

*Primary Examiner* — Reena Aurora
(74) *Attorney, Agent, or Firm* — TraskBritt (57) ABSTRACT

A contactless position sensor comprises a permanent magnet generating a magnetic field and at least one element for detecting magnetic fields (or magneto-sensitive element) in at least two directions. The permanent magnet is capable of moving in a movement direction and has a continuously variable magnetization in the movement direction. The variation in the magnetization has, along the different field components, a shape corresponding to a combination of at least two different quasi-periodic contributions. The sensor further comprises a computer for combining the values of these field components and for determining a precise value of the position.

16 Claims, 8 Drawing Sheets

(56) References Cited

FOREIGN PATENT DOCUMENTS

FR  2937722 A1  4/2010
FR  2965347 A1  3/2012

OTHER PUBLICATIONS

International Written Opinion for International Application No. PCT/FR2022/050028 dated May 11, 2022, 5 pages.

\* cited by examiner

CONTACTLESS POSITION SENSOR COMPRISING A PERMANENT MAGNET

CROSS-REFERENCE TO RELATED APPLICATIONS

This application is a national phase entry under 35 U.S.C. § 371 of International Patent Application PCT/FR2022/050028, filed Jan. 6, 2022, designating the United States of America and published as International Patent Publication WO 2022/152996 A1 on Jul. 21, 2022, which claims the benefit under Article 8 of the Patent Cooperation Treaty of French Patent Application Serial No. FR2100365, filed Jan. 14, 2021.

TECHNICAL FIELD

The present disclosure relates to the field of contactless, magnetic and/or electromagnetic position sensors for the precise measurement of an absolute angular or linear position. Such sensors make it possible to detect an angular position or a linear displacement with high precision on the order of 0.1% of the total stroke, or <0.5° for a detection carried out on a complete revolution.

BACKGROUND

In the prior art, devices for magnetic measurement of the angular (or linear) position of a reference point are known, angularly (or linearly) mobile around an axis, relative to a fixed point. Such a measuring device usually comprises a rotating magnetic element (or magneto-resistive (MR) element) and a magneto-sensitive (MS) element measuring the magnetic flux or the axial and/or radial components of this magnetic flux (or field), to deduce therefrom by calculation the angular position of the sensitive magnetic element relative to a reference point.

A first sensor solution of the "360° Hall effect sensor" type, or the "sinusoidal sensor-cosine sensor" sensor uses a single probe measuring at least two components of the magnetic field, or uses a magnetic circuit generating a proportional variation of the flux during the excursion. The accuracy of such measurement devices is limited (typically >1° mechanical) and can be considered to be insufficient for certain applications (for example, robotics).

The same type of sensor using at least two Hall effect probes makes it possible to improve the precision of such measurement devices, in particular, by the composition of different field components, but still remains close to 0.5° mechanical degrees and may still be considered to be insufficient for certain applications (machine-tools, for example).

Another family of sensors of ferromagnetic type and with a coiled stator, commonly called a resolver (a reluctance resolver, for example), uses a system of transmitter and receiver magnetic coils distributed over the stator part. The accuracy of these resolvers is very important, but these sensors are described as bulky, expensive and complicated to assemble on the application. They are widely used in industry (machine-tools, for example) and in the automotive sector (power steering, transmission) but remain limited to a few high-range applications.

A third family of sensors exploit several magnetic tracks (each bearing a given magnetization profile or magnetic flux), generally indexed between them.

The sensors of the "Nonius" or "Vernier effect" type, for which the number of pairs of poles on the 2 tracks is different, generating a phase shift of the magnetic signals used to specify the angular (or linear) position, are part of this third family.

There are also known, in this family, multipolar "encoder" type sensors making it possible to create digital signals, which are combined to make it possible to determine a relative or absolute angular position, or else the combined sensors associating a "360° Hall effect sensor" and a digital sensor of the "encoder" type, making it possible to combine the rough analog measurement over one complete revolution and a multitude of digital signals making it possible to refine this measurement locally via a dedicated algorithm enabling the calculation of a precise angular value.

These sensors (or encoders) are very precise) (<0.5° and more compact than resolvers, but they require the use of at least 2 magnetic tracks (or EMCs) and at least one magnetic probe (or EMS) per track. These sensors are described as more expensive and complicated to assemble than sensors comprising only a single EMC. Their use is generally limited to high-precision positioning technologies that are found in satellites, machine tools, assembly robots, and medical robots.

French patent FR2923903 is also known, describing an angular or linear magnetic position sensor comprising a mobile element consisting of at least one magnet having a direction of magnetization, which varies linearly along the movement direction of the magnet in a surface defined by the movement direction and a normal direction, at least four magneto-sensitive elements and at least one processing circuit delivering a signal depending on the absolute position of the mobile element, wherein a first set of magneto-sensitive elements is composed of a pair of magneto-sensitive elements located at the same point, spatially offset from a second set of magneto-sensitive elements, also composed of a pair of magneto-sensitive elements located at the same point, in the movement direction of the magnet. A magneto-sensitive element of the first and second sets of magneto-sensitive elements is able to measure the tangential component of the magnetic field and a magneto-sensitive element of the first and second sets of magneto-sensitive elements is able to measure the normal component of the magnetic field. The processing circuit is able to produce at least two algebraic combinations, each algebraic combination comprising a component of the first set of magneto-sensitive elements and a component of the second set of magneto-sensitive elements, so as to define two sinusoidal signals substantially electrically phase-shifted by 90°.

Patent FR2919385 is also known, describing a solution implementing two 360° contactless sensors to produce an absolute multiturn sensor. The first contactless sensor is used to measure the angle of rotation of the rotary member from 0 to 360° and the second sensor is used to determine the number of complete rotations of the rotary member. A mechanical system for continuous gear reduction of ratio n is integrated between the two sensors. The input shaft of the reducer is connected to the first sensor and the rotor of the second sensor is connected to the output shaft of the reducer. Each time the first sensor makes one complete revolution, the second sensor only makes 1/n revolution. The second sensor makes it possible to obtain a measurement of the total absolute angle with a limited precision and resolution, but the first sensor solves this problem by making it possible to refine the measurement of the second sensor and thus obtain a very fine precision and resolution over 360°. In addition, in the event of the first sensor failing, the second makes it possible even to detect (resolution reduced n times) the position in the revolution of the rotary member and to detect the malfunction of the first sensor.

Patent FR2898189 describes another solution of a linear or curvilinear rotary movement magnetic sensor using at least one permanent magnet and at least one magneto-sensitive element, movable relative to each other, wherein the magnet has a direction of magnetization that varies substantially linearly along the movement direction of the magnet over a surface defined by the movement direction and a normal direction, excluding diametral magnetization in the case of a rotary sensor.

Patent EP2711663 describes another solution in the shape of a disc, bearing a point (P) movable in rotation about an axis (Z). A first sensor cooperates with a first magnetic element integral with the disc to measure an approximate angular position (θa) of the point (P) relative to an origin (O). Second magnetic elements are arranged circumferentially on the periphery of the disc. A second sensor is arranged at the origin (O) to measure, for a second magnetic element located opposite this second sensor, the angular position of an upstream end of this second magnetic element relative to the origin (O). Means determine which second element is located opposite the second sensor, as a function of the approximate angular position (θa). Means calculate a precise angular position (θ) of the reference point (P), as a function of the second determined element and the value measured by the second sensor.

The simplest prior art magnetic sensors do not make it possible to obtain sufficient angular precision (or linear precision) to be used successfully in applications requiring high precision positioning.

BRIEF SUMMARY

The purpose of the present disclosure is to remedy this major drawback by providing a simple and inexpensive device for magnetic measurement of an angular or linear position. According to its most general acceptance, the present disclosure relates to a contactless position sensor comprising a permanent magnet (or magneto-coding element) generating a magnetic field and at least one detection element of the magnetic field (or magneto-sensitive element) in at least two directions, the permanent magnet being able to move in a movement direction and having continuously variable magnetization along the movement direction, wherein the variation in the magnetization presents, according to the various field components, a shape corresponding to a combination of at least two (quasi-)periodic contributions. The sensor further comprises a computer for combining the values of these field components and for determining a precise position value.

The term "quasi-periodic" refers to the generalization of a periodic combinatorial, with patterns that have minor variations from one period to another, but constant intervals for each of the patterns.

The detection element may optionally be placed in a flux concentrator.

The magnetization advantageously varies according to the different field components according to a shape corresponding to a combination of at least two periodic contributions according to different periods $p$ and $n*p$ (real $n>0$, constant or variable over the displacement), the second pattern being the signal carrying the first, this double pattern making it possible to combine a rough measurement and a fine measurement of the position in the excursion carried out via the measurement of at least two of the components of the magnetic field.

Advantageously, the carrier and carried signals are indexed with one another to create a phase shift proportional to the excursion performed.

According to a particular embodiment, the carrier and carried signals are aperiodic.

Preferably, the magnetization has at least one magnetic anomaly for the detection of the mechanical complete revolution or a given position in an excursion.

According to one variant, the magnetization variation has a shape corresponding to the combination of three periodic variations, the third pattern of period $m*p$ (real $m>0$, constant or variable over the displacement) making it possible to carry out, for example, a detection of the number of mechanical complete revolutions or one or more given positions in an excursion.

According to one variant, the permanent magnet (or magneto-coercive element) consists of at least one multipole permanent magnet, or a multi-pole magnet assembly.

According to one variant, the permanent magnet is all or part of the rotor of an electric motor, a generator, an actuator, a reducer, or a coupler.

Advantageously, the permanent magnet consists of a set of current loops.

According to one variant, the magnetization variation has a shape corresponding to the combination of a multitude of periodic or quasi-periodic variations, making it possible to perform precise detection of the position in an excursion, to know the number of excursions produced and to reinforce the precision of the measurement and its resilience to external disturbances (parasitic magnetic field, for example).

Advantageously, the magneto-sensitive element consists of at least one Hall probe measuring the at least two magnetic field component directions, or a quasi-point assembly of magneto-sensitive elements.

According to one alternative, the magneto-sensitive element is constituted by a magneto-resistive probe.

According to another alternative, the magneto-sensitive element is an eddy current probe.

According to another alternative, the magneto-sensitive element comprises a plurality of probes.

According to a particular embodiment, the sensor further comprises means for calculating and storing the calculated angular values and/or the linearity of the sensor.

According to a particular embodiment, the measuring device according to the present disclosure combines analog detection and digital detection of the magnetic field components, for example, to save computing time.

Optionally, the device has a degraded operating mode (combination of the field components) in the event of a failure of one of the components of the field or an operating mode (combination of the field components) making it possible to compensate for the measurement disturbances of external origin.

The present disclosure also relates to a measuring device comprising means for calculating and storing the calculated angular values and/or the linearity of the sensor.

The present disclosure also relates to the application of an aforementioned position sensor or the measurement of additional values to a complex system, comprising a force, a torque, an acceleration, a braking, a phase shift, an overall speed, a movement direction, a number of revolutions, an inertia, an imbalance, a vibration, a noise, a harmonic content, a temperature, a pressure, an electrical current, or an electrical voltage.

BRIEF DESCRIPTION OF THE DRAWINGS

The present disclosure will be better understood on reading the following description, which concerns a non-limiting exemplary embodiment that is shown by the accompanying drawings, in which.

DETAILED DESCRIPTION

Figure 1:
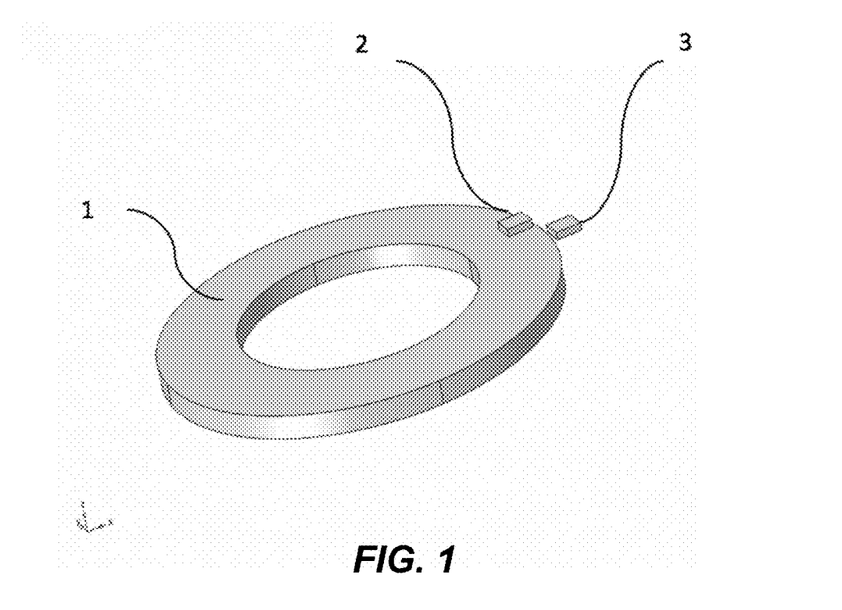
FIG. 1 shows a schematic view of an angular position sensor according to the present disclosure.

Mechanical structure of an example angular sensor according to the present disclosure FIG. 1 shows a rotary sensor structure according to the present disclosure. The magnetic flux generated by a disc-shaped permanent magnet (1) is collected at the periphery thereof by one or two detection elements located radially or axially (2, 3) measuring two components of the magnetic induction along two orthogonal axes, if necessary, via flux collectors defining an air gap wherein the detection element (2, 3) is placed, typically a Hall probe. In the prior art, the magnetization is in some cases diametrically variable, and in others radially and/or axially variable.

It is known that each permanent magnet has a magnetization whose direction is defined by a magnetization vector. This magnetization vector defines the direction of the magnetic field inside the magnet. This direction depends on the way in which the magnet is polarized during its production. For example, a non-polarized magnet in the shape of a "ring" placed in a sufficient homogeneous unidirectional magnetic field will have its magnetization direction oriented along the direction of this magnetic field. In the case where the magnetic field is oriented in a direction perpendicular to the axis of rotation of the magnet (it is then referred to as a diametrical magnetization) and if this magnet moves in rotation about its axis, the direction of magnetization seen at a fixed point of the space inside the magnet will therefore be continuously variable according to a linear function. The present disclosure relates to the family of sensors where the magnetization direction of the permanent magnet varies in a multi-(quasi-) periodic manner. This is the case when the magnetization direction takes the same value when the magnet moves by a predetermined distance (a period of the signal according to one of the field components).

General Principles of the Present Disclosure

Figure 2:
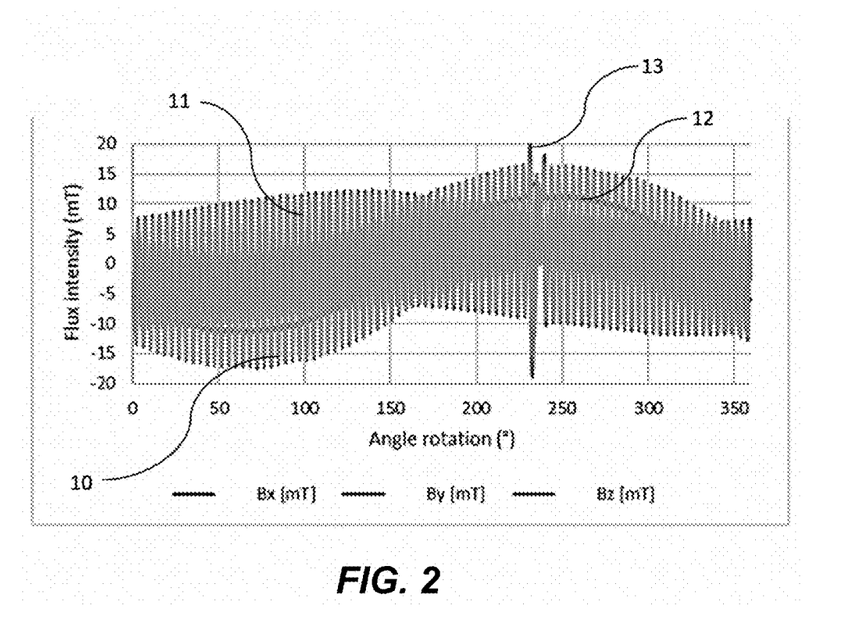
FIG. 2 shows an example magnetization profile according to the present disclosure.

The sensors according to the present disclosure are differentiated by the complex magnetization profile resulting in multi-periodic variations of the amplitude of the magnetization (or of its orientation relative to an axis or reference point) as a function of the relative trajectory of the measurement air gap and of the magnet, as shown according to a non-limiting example in FIG. 2, concerning a single annular, disc-shaped, tubular or annular magnet, and measured at a single measurement point. In this example, Bx=Brad (curve 10); By=B tan (curve 11); Bz (curve 12); for this profile, the number of increments of the signal along the various measurement axes N=2; P=216 and T=4 (N being the number of increments defined on the carrier signal, P and T the numbers of increments defined on the signals carried).

The magnetization level is measured at a single point by one or more magneto-sensitive elements located substantially at the same point, for example, by a Hall probe of the Triaxis type (trade name), and allowing the calculation of an angular (or linear) position with high precision (<0.5° for a detection carried out on a complete revolution), which is not very bulky and easy to assemble.

The magnetization profile present according to an example of a (carried) pattern of period p comprising p measurement increments and a (carrier) pattern of period p*n (real n>0; constant or variable) having N increments. This double pattern makes it possible to combine a rough detection (rough output) and a finer detection of the absolute position (fine output). A measurement increment is, for example, constituted by the measurement of a magnetic pole. Two poles of reverse polarity will thus be able to constitute a given period of period.

FIG. 2 shows these two patterns mentioned above and allowing the two types of position calculation:

the "rough" output allowing a reading of the position on a revolution, this output signal comprises a predetermined number of N increments measuring distributed over the interval of the measurement (1 mechanical revolution, for example); in this precise case, the components [Brad; B tan] or [Bz; B tan] can be used for the calculation of the angular value, via the calculation of the arctangent of the ratio of these components.

a "fine" output, carried by the "rough" signal, making it possible to locally refine the measurement of the angular position; this output signal comprises a predetermined number of P measuring increments over the interval of the measurement; in this precise case, the components [Bz; B tan] will be used for the calculation of the angular value.

and also one (or more) magnetic anomaly(s) leading to atypical flows (13) serving as "revolution-counting" indexes making it possible to count the number of revolutions or events carried out beyond a first excursion. This output signal comprises a predetermined number of T measuring increments over the measurement interval.

In the example shown in FIG. 2, for the proposed magnetization profile: N=2, P=216 and T=4 are noted.

By processing each signal and by combining these signals, an absolute indication of angular position is obtained for a detection carried out on one or more mechanical revolutions of the sensor.

For other magnetization patterns, and or other collection points of the field values, other combinations of the field components $B_{rad}$ (20), $B_{tan}$ (21) and $B_z$ (22) may be favored to calculate this absolute angular position.

Figure 3:
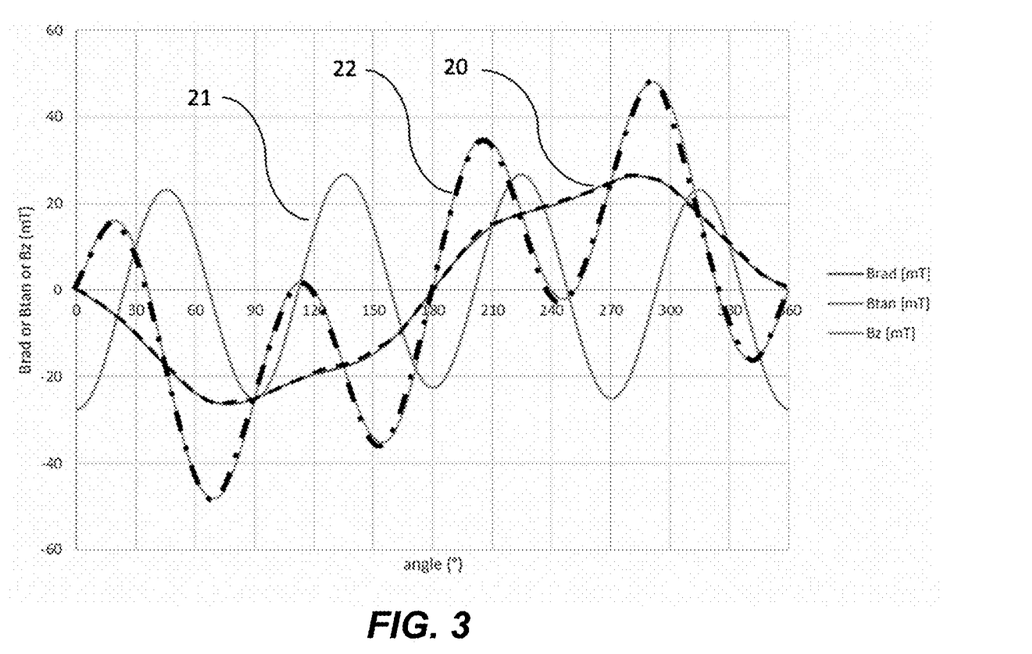
FIG. 3 shows the curve of variation of the magnetic field components measured by the measurement probe.

The principle of computing the position will be more readily understood through the description of an example with a simpler field profile, for example, with N=2, P=8 and T=0 (FIG. 3).

Figure 4:
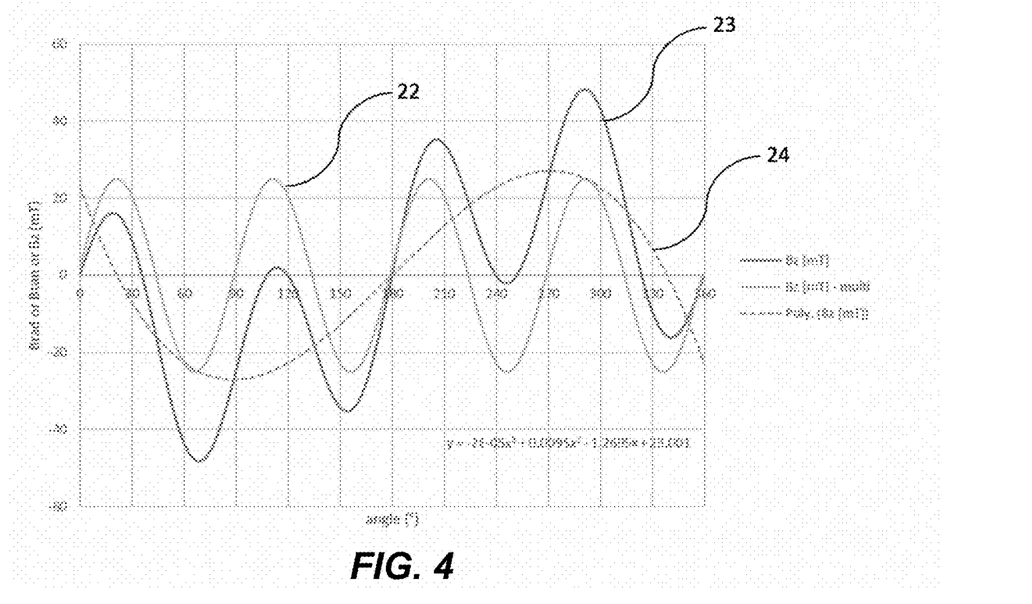
FIG. 4 shows the curve of variation of the magnetic field components measured by the measurement probe as well as the average of the envelope signal.

The component Bz (22) can be easily broken down into a carrying component (23) with N increments (the average of the envelope signal—see the curve (24) Poly(Bz) in FIG. 4) and a carried signal with P increments obtained by subtracting the signal Bz (22) from the average of the envelope signal (not shown in FIG. 4) where the curve (20) corresponds to the variation of the signal $B_{rad}$(20), the curve (21) corresponds to the variation of the signal $B_{tan}$ and the curve (22) corresponds to the variation of the signal $B_z$.

Figure 5:
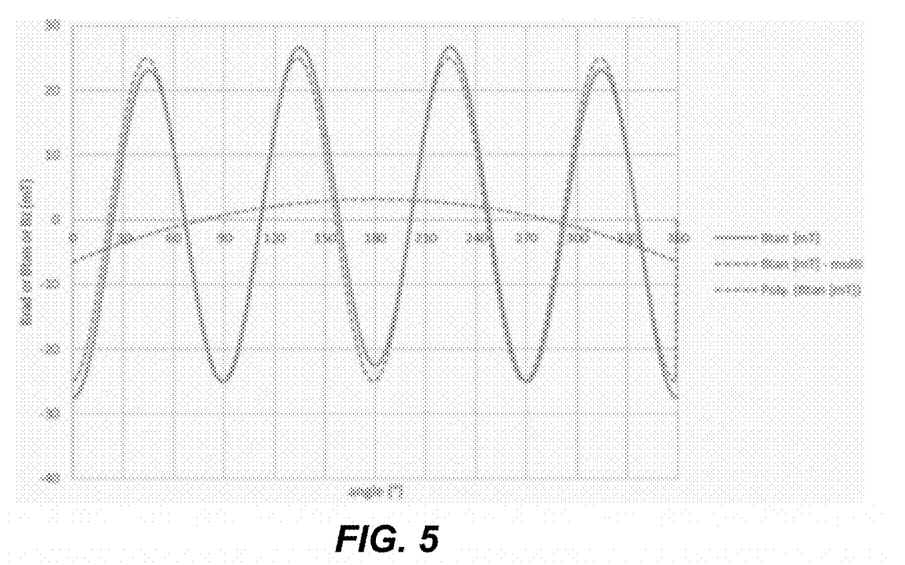
FIG. 5 shows the curve of variation of the fine signal components comprising P increments, phase-shifted by a quarter of period p.

Likewise, the B tan component (21) will provide an envelope at n increments phase shifted by a quarter-period n*p relative to the equivalent signal, calculated for the component $B_z$ (22). It also will provide a fine signal comprising p increments, phase-shifted by a quarter-period p (FIG. 5).

The averages of Bz envelopes (denoted env(Bz)) and of B tan (denoted env(B tan)) may be combined to calculate the "rough" output signal, by calculating, for example, the angle Theta(N) (N referring to the number of increments):

Theta(N)=A tan(env(Bz)/(env(B tan)*Gain))

Figure 6:
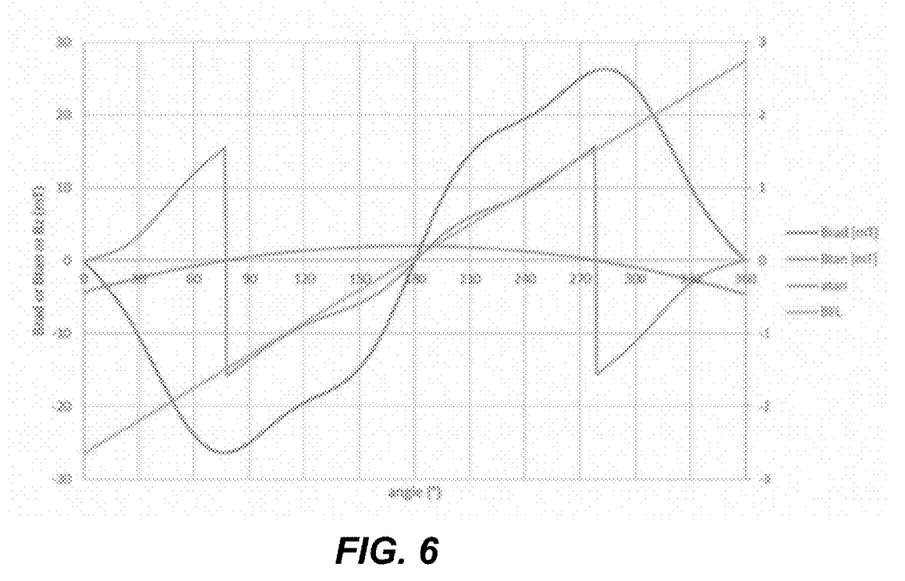
FIG. 6 shows the curve of variation of the signal Brad and of the signal B tan, and an example combination of these signals for the "rough" determination of the angular value (a tan) on the excursion.

Likewise, the signal $B_{rad}$ could also be directly combined with the signal env(B tan) to determine the angle Theta(N) (N referring to the number of increments):

Theta(N)=A tan(B rad/(env(B tan)*Gain)) denoted a tan in FIG. 6.

The value of the "gain" parameter will be calculated to bring the ratio of the intensities to a value close to 1, and to limit the distortion of the signal calculated with respect to the ideal signal (denoted BFL (best fit line) in FIG. 6).

Considering the distortions of the signals and indexing deviation, the linearity of this signal is entirely sufficient to determine an angular position in the revolution, with a significant non-linearity on the output signal.

Figure 7:
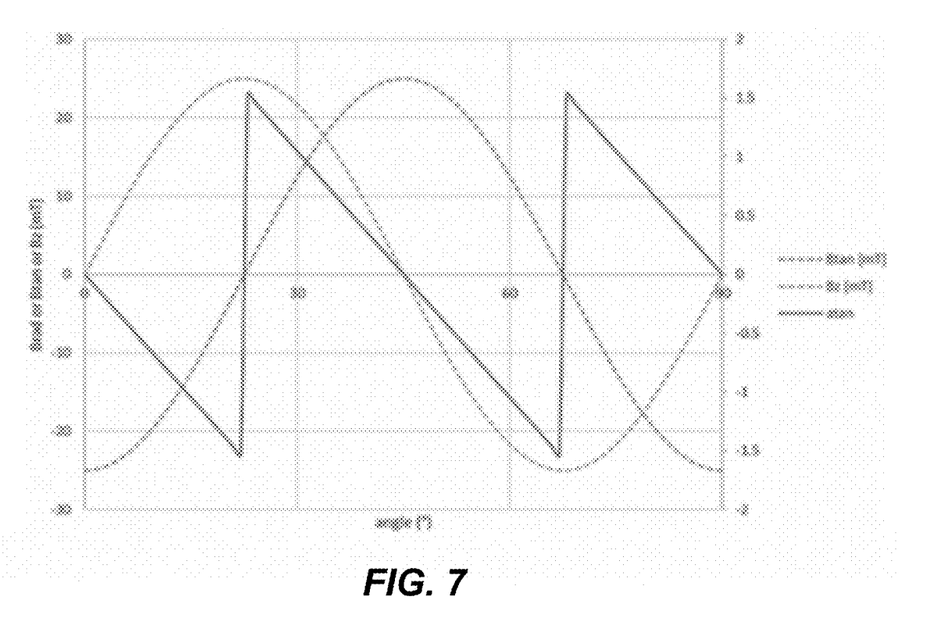
FIG. 7 shows the curve of variation of the signals at P increments derived from the components Bz and B tan, and an example combination of these signals for the "fine" determination of the angular value (a tan) on the excursion.

In order to refine this angular position measurement, it is possible, in the same way, to combine the signals with P increments resulting from the components Bz and B tan as shown in FIG. 7.

With N=4, a precise linear signal is defined on ¼ of the total mechanical excursion (for example, one 360° revolution).

Combining the 2 output signals can identify:
with the "rough" output: the angular sector of the increment P as measured;
with the "fine" output: in this sector of the increment P, the precise angular value.

Figure 8:
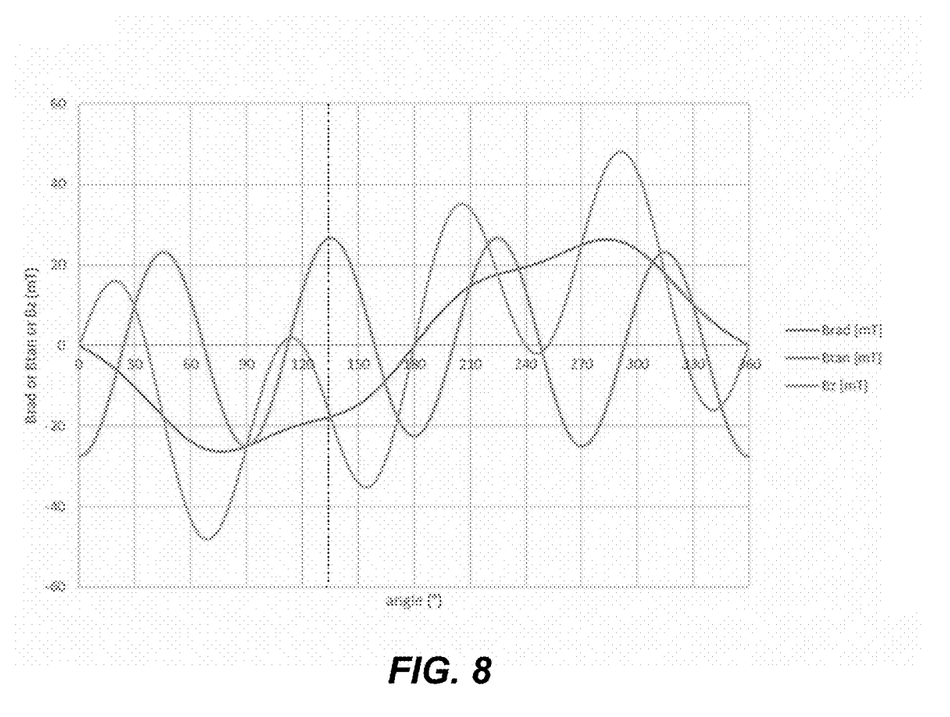
FIG. 8 shows a second example of a magnetization profile according to the present disclosure and the description of the position measurement indicated by the red line.

In the example shown in FIG. 8 (measurement at the value indicated by the dotted line), the "rough" output indicates a measurement of the order of 130° (therefore the measurement point is located on the $1^{st}$ increment N and the $3^{rd}$ increments P according to Bz) and the "fine" output indicates=320 degrees electrical on the increment P=3, that is 320/P=40 degrees mechanical on the increment P3, that is, in total 45° ($1^{st}$ increment P)+45° ($2^{nd}$ increment P)+40° (read in $3^{rd}$ increment P)=130°, to the precision of the NL obtained on the "fine" output: commonly +/−3 degrees electrical over the increment P is here +/−3°/P=+/−0.375° mechanical.

the value read will therefore be 130°+/−0.375° in an absolute manner.

Adding a revolution-counting index (T=1 or T=2; not shown) makes it possible to increment a counter by simply detecting the number of flow peaks detected in Bz (for example) beyond a certain reference threshold. The angular value in the last revolution and the number of complete revolutions produced is thus determinable.

The person skilled in the art will immediately understand that the angular precision of the sensor will be all the more significant since the number of increments P will be significant.

Figure 9:
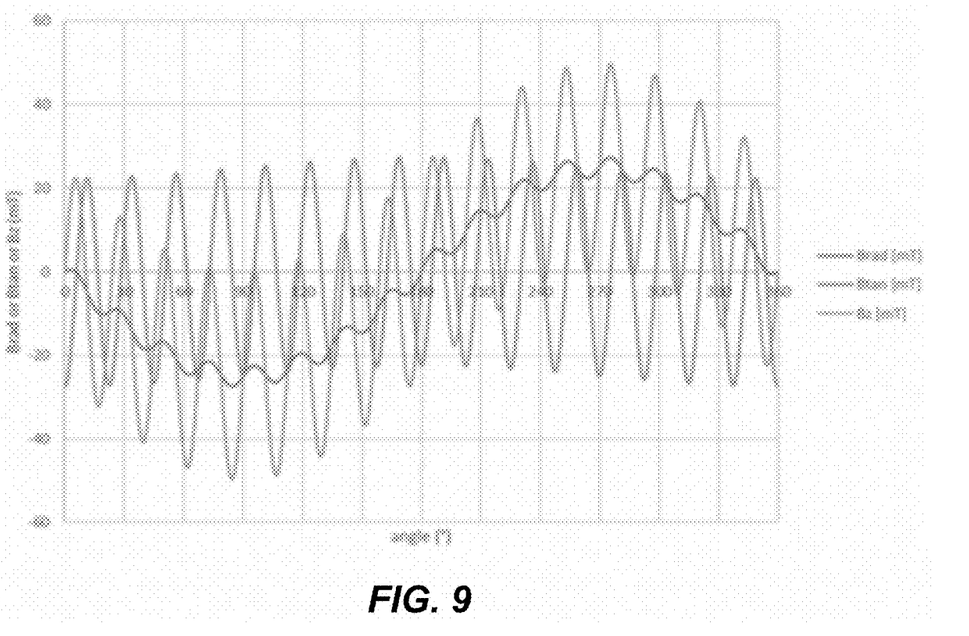
FIG. 9 shows a third example of a magnetization profile according to the present disclosure adjusted such that N'=2, P'=32 and T'=0.

For the same position precision resulting from the treatment over an increment N, the precision of the ratio sensor can be increased:

P'/P=4 to reach+/−0.09° mechanical (FIG. 9)

Figure 10:
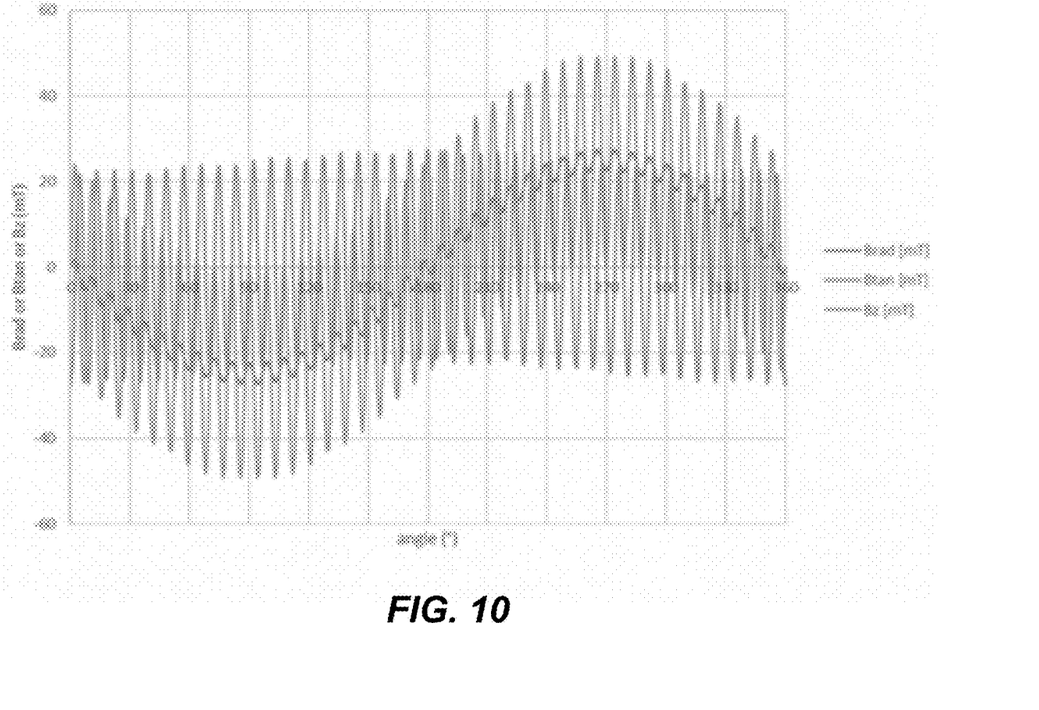
FIG. 10 shows a fourth example of a magnetization profile according to the present disclosure adjusted such that N"=2, P"=82 and T"=0.
Figure 11:
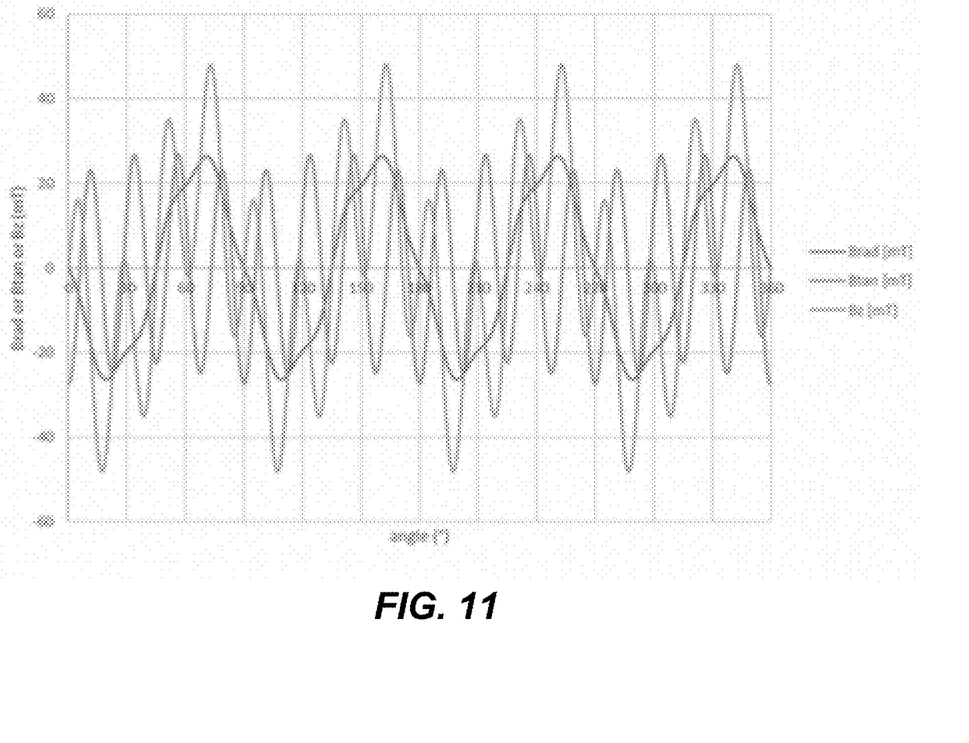
FIG. 11 shows a fifth example of a magnetization profile according to the present disclosure adjusted such that N=8, P=32 and T=0.

P"/P=10.25 to reach+/−0.036° mechanical (FIG. 10)

For the practical implementation of this sensor, it can, without limitation, be considered:
a probe fixed relative to a moving magnet,
a probe movable relative to a fixed magnet, or
a mixture of the two preceding items.

Figure 12:
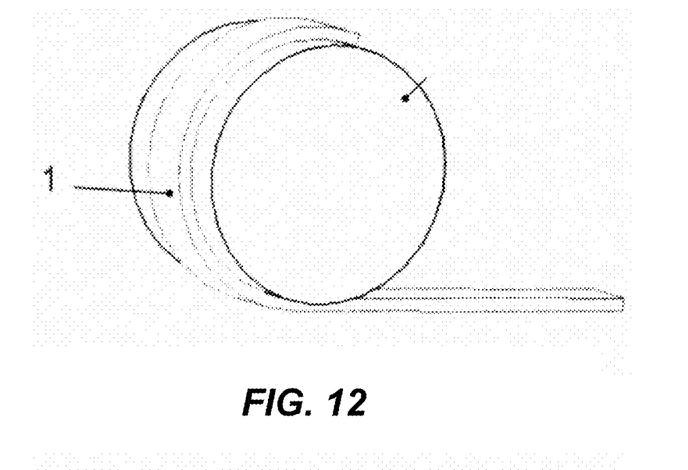
FIG. 12 shows the detection principle adapted to curvilinear displacement.
Figure 13:
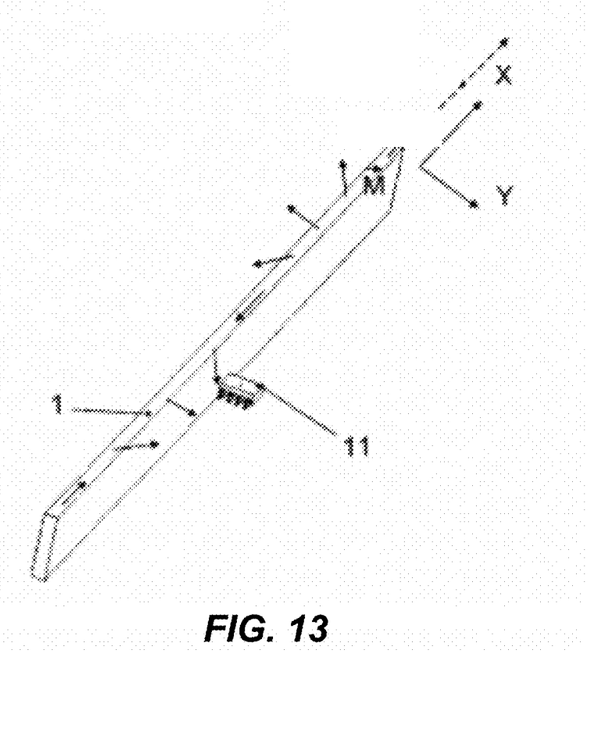
FIG. 13 shows the detection principle adapted to linear displacement.

Mechanical Structure of an Example Linear or Curvilinear Displacement Sensor According to the Present Disclosure FIGS. 12 and 13 show alternative embodiments of a displacement sensor, respectively curvilinear or linear. The disc-shaped permanent magnet (1) has a flat or curved shape (winding on a part of a cylindrical hub) with a magnetization whose orientation varies with field components corresponding to a combination of at least two different quasi-periodic contributions. A detection element (11) of the magnetic field (or magneto-sensitive element) in at least two directions makes it possible to calculate the value of the linear displacement.

The detection principle of the present disclosure is easily transposed to the measurement of a linear or curvilinear displacement. For this purpose, it is sufficient to mentally open and unwind (FIG. 12) a ring or a magnetized disc-shaped permanent magnet (1) to properly understand the principle: the magnetization profile varies continuously according to a linear movement of the magnetic track obtained (FIG. 13).

The mode of detection and calculation of the position remains unchanged. The value of the linear displacement is obtained by indexing this displacement to the angular variation of the magnetic field carried out: for example, a 360° rotation of the magnetic field carried out on a 20 mm path will constitute the carrier signal.

The superposition of a more precise periodic pattern (for example, a 360° rotation of the field over a 5 mm path repeated over the total of 20 mm) will constitute the signal carried will make it possible to obtain as previously described a more precise detection of this linear displacement. Considering commonly +/−3° precision of these 360° electrical, a precision of +/−0.041 mm on the linear displacement can be obtained.

Finally, adding one or more point magnetic anomalies (constituting the second carried signal) will make it possible to detect one or more particular positions on the linear displacement.

The invention claimed is:

1. A contactless position sensor, comprising:
    a permanent magnet generating a magnetic field, the permanent magnet being able to move in a movement direction and having a continuously variable magnetization along the movement direction, a variation in the continuously variable magnetization having, according to different field components, a shape corresponding to a combination of at least two different quasi-periodic contributions; and
    at least one detection element of the magnetic field in at least two directions; and
    a computer configured to combine values of the field components and to determine a precise position value;
    wherein the magnetization varies with a carrier frequency of period p*n, where n is a real number greater than zero that is constant or variable on an excursion, a measurement of the magnetization determines a rough position, and at least one secondary signal carried by lower period p provides a signal whose processing provides a fine measurement of the position.

2. The position sensor of claim 1, wherein the carrier and carried signals are indexed to each other to create a phase shift proportional to the excursion performed.

3. The position sensor of claim 2, wherein the carrier and carried signals are aperiodic.

4. The position sensor of claim 2, wherein the magnetization has at least one magnetic anomaly for the detection of a mechanical complete revolution or a given position in an excursion.

5. The position sensor of claim 2, wherein the permanent magnet comprises at least one multipole permanent magnet, or a multi-pole magnet assembly.

6. The position sensor of claim 1, wherein the permanent magnet comprises at least a portion of a rotor of an electric motor, a generator, an actuator, a reducer, or a coupler.

7. The position sensor of claim 1, wherein the permanent magnet comprises a set of current loops.

8. The position sensor of claim 1, wherein the at least one detection element comprises at least one Hall probe measuring at least two magnetic field components, or a quasi-point assembly of magneto-sensitive elements.

9. The position sensor of claim 1, wherein the at least one detection element comprises a magneto-resistive probe.

10. The position sensor of claim 1, wherein the at least one detection element comprises an eddy current probe.

11. The position sensor of claim 1, wherein the at least one detection element comprises a plurality of probes.

12. A measurement device comprising a sensor according to claim 1, comprising means for calculating and storing calculated angular values and/or linear position values of the sensor.

13. The measurement device of claim 12, wherein the sensor is configured to operate in a degraded operating mode in response to failure of at least one component of the measurement device.

14. The measurement device of claim 12, wherein the sensor is configured to operate in a mode enabling compensation for measurement disturbances of external origin.

15. The measuring device of claim 12, wherein in the sensor is configured to combine an analog measurement and a digital measurement of the magnetic field components.

16. A method, comprising:
    incorporating a position sensor according to claim 1 into a machine or system; and
    measuring at least one parameter of the machine or system, the at least one parameter comprising a force, a torque, an acceleration, a braking, a phase shift, an overall speed, a movement direction, a number of revolutions, an inertia, an imbalance, a vibration, a noise, a harmonic content, a temperature, a pressure, an electrical current, or an electrical voltage.

* * * * *